(12) United States Patent
Toennesen et al.

(10) Patent No.: US 7,663,533 B2
(45) Date of Patent: Feb. 16, 2010

(54) RADAR SYSTEM FOR MOTOR VEHICLES

(75) Inventors: Tore Toennesen, Allershausen (DE);
Frank Gottwald, Weissach (DE);
Thomas Binzer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 10/587,664

(22) PCT Filed: Dec. 6, 2004

(86) PCT No.: PCT/EP2004/053275
§ 371 (c)(1),
(2), (4) Date: Jun. 10, 2007

(87) PCT Pub. No.: WO2005/073753
PCT Pub. Date: Aug. 11, 2005

(65) Prior Publication Data
US 2007/0222662 A1 Sep. 27, 2007

(30) Foreign Application Priority Data
Jan. 29, 2004 (DE) .................. 10 2004 004 492

(51) Int. Cl.
*G01S 13/00* (2006.01)
(52) U.S. Cl. .................. 342/70; 342/154
(58) Field of Classification Search ............. 342/70–72, 342/81
See application file for complete search history.

(56) References Cited

U.S. PATENT DOCUMENTS

| | | | | |
|---|---|---|---|---|
| 3,521,277 A * | 7/1970 | Evans | ......................... | 342/195 |
| 5,008,678 A * | 4/1991 | Herman | ....................... | 342/158 |
| 5,784,022 A * | 7/1998 | Kupfer | ......................... | 342/80 |
| 5,793,325 A * | 8/1998 | Yamada | ........................ | 342/70 |
| 5,815,112 A * | 9/1998 | Sasaki et al. | .................. | 342/70 |
| 5,949,365 A * | 9/1999 | Wagner | ........................ | 342/70 |
| 5,959,571 A * | 9/1999 | Aoyagi et al. | ................. | 342/70 |
| 6,005,511 A * | 12/1999 | Young et al. | ................... | 342/70 |
| 6,130,640 A * | 10/2000 | Uematsu et al. | ............. | 342/175 |
| 6,414,624 B2 * | 7/2002 | Endo et al. | .................... | 342/70 |
| 6,452,534 B1 * | 9/2002 | Zoratti et al. | ................. | 342/70 |
| 6,492,949 B1 * | 12/2002 | Breglia et al. | ......... | 343/700 MS |
| 6,509,863 B2 * | 1/2003 | Zoratti et al. | ................. | 342/70 |
| 6,577,269 B2 * | 6/2003 | Woodington et al. | ........ | 342/196 |
| 6,593,873 B2 * | 7/2003 | Samukawa et al. | ............ | 342/70 |
| 6,657,581 B1 * | 12/2003 | Lippert et al. | ................. | 342/70 |
| 6,750,810 B2 * | 6/2004 | Shinoda et al. | ............. | 342/149 |
| 6,864,831 B2 * | 3/2005 | Woodington et al. | .......... | 342/70 |
| 7,151,479 B2 * | 12/2006 | Beez et al. | ..................... | 342/70 |
| 7,173,561 B2 * | 2/2007 | Isaji | ........................... | 342/70 |
| 7,268,722 B2 * | 9/2007 | Gottwald et al. | .............. | 342/70 |
| 2002/0163478 A1 * | 11/2002 | Pleva et al. | ................. | 343/853 |
| 2002/0175852 A1 * | 11/2002 | Zoratti et al. | ................. | 342/70 |
| 2003/0122704 A1 * | 7/2003 | Dubrovin | ..................... | 342/70 |

FOREIGN PATENT DOCUMENTS

JP 6174821 6/1994

* cited by examiner

*Primary Examiner*—Thomas H Tarcza
*Assistant Examiner*—Peter M Bythrow
(74) *Attorney, Agent, or Firm*—Kenyon & Kenyon LLP

(57) ABSTRACT

A radar system for motor vehicles, having a least one radar sensor having a range of less than 50 m for monitoring traffic in an adjacent lane, wherein the radar sensor has a phase-controlled antenna and a control device for setting a plurality of radar lobes having different geometries.

11 Claims, 3 Drawing Sheets

RADAR SYSTEM FOR MOTOR VEHICLES

FIELD OF THE INVENTION

The present invention relates to a radar system for motor vehicles having at least one radar sensor for monitoring the area surrounding the vehicle and in particular the vehicles in an adjacent lane.

BACKGROUND INFORMATION

Using radar systems in motor vehicles, it is possible to measure the distance to other vehicles and also, using the Doppler effect, the relative speeds of other vehicles or other objects in the surroundings of the vehicle. Conventionally, they have been used to automatically bring the speed of the host vehicle in line with the speed of a preceding vehicle and to regulate the distance to the preceding vehicle.

Furthermore, in the case of radar systems which in particular also make it feasible to monitor the traffic in adjacent lanes, there are many motor vehicle applications, e.g., parking or reverse assist systems for blind-spot object detection, pre-crash functions, stop & go functions and the like. Pre-crash functions are functions which allow an upcoming collision to be automatically detected and averted or at least mitigated via intervention in the brake system, drive system and/or steering system and/or allow timely configuration of passive safety systems, e.g., seatbelt tighteners or airbags, with regard to the upcoming collision. Stop & go functions constitute a further refinement of conventional distance control systems, and in congested or city traffic allow the vehicle to be automatically braked to a standstill and if necessary move off again if the preceding vehicle moves off. As these functions are mainly used in the lower speed range and in rapidly changing traffic situations, it is particularly important to monitor the traffic in adjacent lanes.

A further possible application for radar systems of the aforementioned kind is a lane-change assistant, which helps the driver change lanes on multi-lane roads, e.g., to prevent collisions with passing vehicles.

For all the aforementioned functions, in particular radar systems having a short or medium range are used to monitor the immediate surroundings of the host vehicle, and which also provide as much spatial resolution as possible. Pulsed radar systems are particularly suitable for this purpose.

In the case of long-range radar systems such as those used for distance regulation, angular resolution systems, e.g., multiple beam radar systems are used which use a plurality of antenna patches to generate a plurality of overlapping radar lobes having slightly different emission directions and allow angular information regarding the located objects to be obtained via analysis of the phase position of the radar echo, so that as part of distance regulation a distinction can be made between vehicles in the same lane as the host vehicle and traffic in adjacent lanes.

By contrast, in the case of systems having a shorter range, which in particular also allow the area surrounding the rear of the vehicle to be monitored, conventional designs use a plurality of separate radar sensors, each of which is designed and specifically positioned for a specific monitoring task. For example, in the case of one of these designs a total of four radar sensors are provided, which are situated in pairs on both sides of the vehicle. One sensor of each pair generates a radar lobe oriented obliquely backwards for detecting vehicles in the adjacent lane and behind the host vehicle, and the second sensor of the pair generates a radar lobe oriented sideways, preferably roughly at the height of the rear bumper of the host vehicle, for illuminating the blind spot in the immediate vicinity of the host vehicle.

SUMMARY

The present invention may have the advantage that traffic in adjacent lanes in the immediate surroundings of the host vehicle may be reliably monitored at a lower installation cost.

According to an example embodiment of the present invention, the radar sensor, which preferably has a range of less than 50 m, has a phase-controlled antenna and a control device for setting a plurality of radar lobes having different geometries.

Phase-controlled antennas are generally conventional in existing radar technology. In the case of such antennas, a plurality of antenna elements, e.g., patches, having signals which are phase-shifted with respect to each other are controlled so that the geometry of the radar lobes, i.e., the angular distribution of the radar signal, is influenced by interference effects. The geometry of the radar lobes may then be varied by controlling the relative phase position of the individual patches.

According to an example embodiment of the present invention, this principle may be used to integrate a plurality of monitoring functions into a single sensor so that the number of sensors required, and thus the installation costs, may be reduced. At the same time, it may be possible to ensure more reliable and precise location by controlling the geometry of the radar lobe in a targeted manner.

For example, by phase-controlling the antenna in a suitable manner, it is possible to ensure that a single sensor generates a medium-range radar lobe oriented obliquely backwards as well as a secondary lobe oriented approximately at a right angle to the vehicle's longitudinal axis for monitoring the adjacent lane roughly at the height of the rear bumper of the host vehicle. As a result, no more than one sensor is required on each side of the vehicle, instead of the two sensors required heretofore.

The radar lobes having different orientations and shapes may be generated simultaneously as well as consecutively, depending on the type of embodiment. Furthermore, it is also possible to generate a plurality of radar lobes, e.g., two, at any instant, and to vary the shape and direction of these radar lobes in specified time intervals or if necessary based on the situation, by modifying the phase control. Variations of this kind make it possible in particular to obtain more accurate directional information by comparing the amplitudes and/or phases of the radar echo received using different configurations. In addition, it is possible to enlarge the total possible detection area.

The secondary lobes oriented roughly at a right angle to the vehicle's longitudinal axis may also be used to detect guard rails, so that it is possible to determine which lane the host vehicle is traveling in and whether the driver is approximately keeping to the middle of the lane. Thus, using the radar system according to the example embodiment of the present invention, an automatic lane departure warning may be issued and/or a corrective steering intervention triggered.

According to a further refinement, the phase control of the antenna may also be used to adjust the radar lobe or lobes in a suitable manner on curves. In this case, the phase control may for example be a function of the turning of the steering wheel or of the measured longitudinal speed and yaw rate.

BRIEF DESCRIPTION OF THE DRAWINGS

An exemplary embodiment of the present invention is shown in the figures and explained in greater detail below.

DETAILED DESCRIPTION OF EXAMPLE EMBODIMENTS

Figure 1:
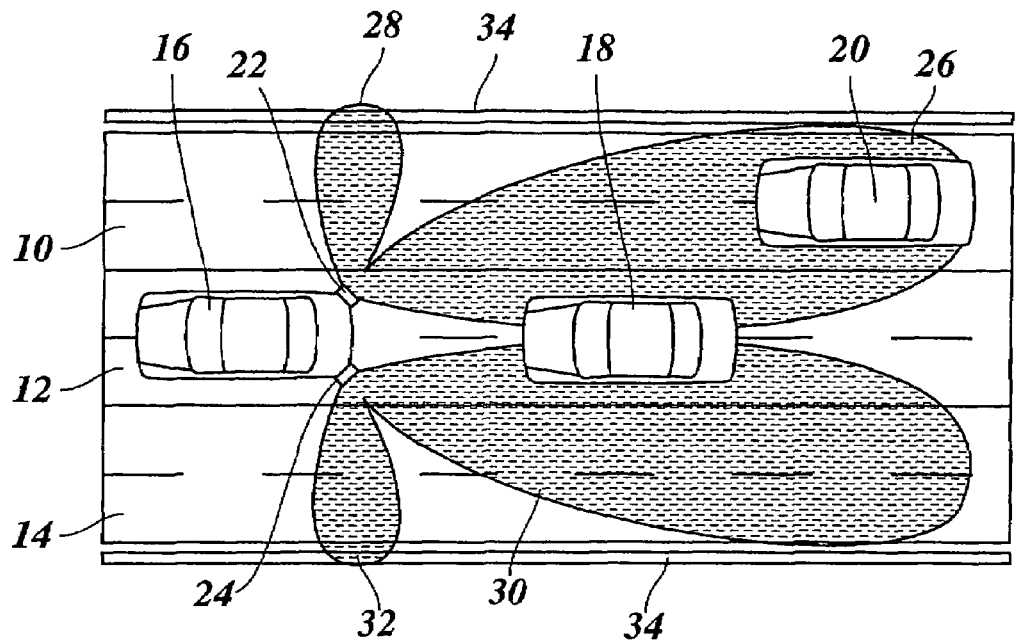
FIG. 1 shows a schematic drawing of a radar system according to an example embodiment of the present invention.

FIG. 1 shows a section of a road having three lanes 10, 12, 14, on which vehicle 16 equipped with a radar system and two further vehicles 18, 20 are traveling. The radar system of vehicle 16 is in this case formed by two radar sensors 22, 24, each of which is situated on one side of the vehicle on a level with the vehicle tailgate. Radar sensors 22 and 24 have phase-controlled antennas, which are used to generate radar lobes 26, 28 and respectively 30, 32 having different geometries. Radar lobes 26 and 30 are main lobes which are oriented obliquely backward and monitor the traffic in adjacent lanes 10, 14 behind vehicle 16 if the vehicle is traveling in middle lane 12. Radar lobes 28 and 32 are secondary lobes which are oriented generally at a right angle to the longitudinal direction of vehicle 16 and monitor the areas in the two adjacent lanes 10, 14 at the height of the rear bumper of vehicle 16.

Radar sensors 20, 24 transmit short radar pulses and measure the propagation time and the Doppler shifts of the radar echoes received from the located objects, e.g., vehicles 18, 20. Using this data, the distances to and relative speeds of the located objects may be calculated. By analyzing the phase of the received radar echo, it is also possible in principle to obtain angular information regarding the located objects. By analyzing the phases at various elements of the antenna, it is possible to determine whether the object is located in the main or secondary lobe. Further information regarding the locations and movements of the objects may be obtained via a tracking procedure, in a conventional manner. This procedure involves comparing sets of data received in various measuring cycles (which may include one or a plurality of radar pulses) at short time intervals so that the objects' changes in location and speed may be tracked. If for example vehicle 16 has passed vehicle 20 shortly before the situation shown in FIG. 1, an echo generated by vehicle 20 has first been received by radar lobe 28 and then by radar lobe 26. In this way, it is possible to determine that vehicle 20 is in adjacent lane 10 and not directly behind vehicle 16 in lane 12 in which said vehicle is traveling. In the example shown, a further criterion that makes lane detection feasible is that vehicles for which, as in the case of vehicle 20, a large distance is measured, must be located in adjacent lane 10, because if the distance is large radar lobe 26 no longer covers middle lane 12. Vehicles which, like vehicle 18, are situated in lane 12 in which vehicle 16 is traveling may also be detected from the fact that they are located by both radar sensors 22 and 24, while vehicles in adjacent lanes are only located by one of the sensors.

Therefore the system described provides reliable monitoring of vehicles in both adjacent lanes 10, 14, via two radar sensors 22, 24. Herein, the monitored longitudinal section of the adjacent lanes extends from the level of vehicle 16 (radar lobes 28 and 32) for a distance of about 40 m behind vehicle 16 (radar lobes 26 and 30).

Provided the road is flanked on at least one side by a guard rail 34, the guard rails too are located by radar lobes 28 and 30. This allows the lane in which host vehicle 16 is traveling to be determined. This information may also be used in a suitable analyzer system to issue a lane departure warning if the driver departs significantly from the middle of the lane without having actuated a turn signal.

The width of main lobes 26, 30 preferably corresponds roughly to the width of the lanes so that narrow objects, e.g., two-wheeled vehicles, are also reliably detectable.

Figure 2:
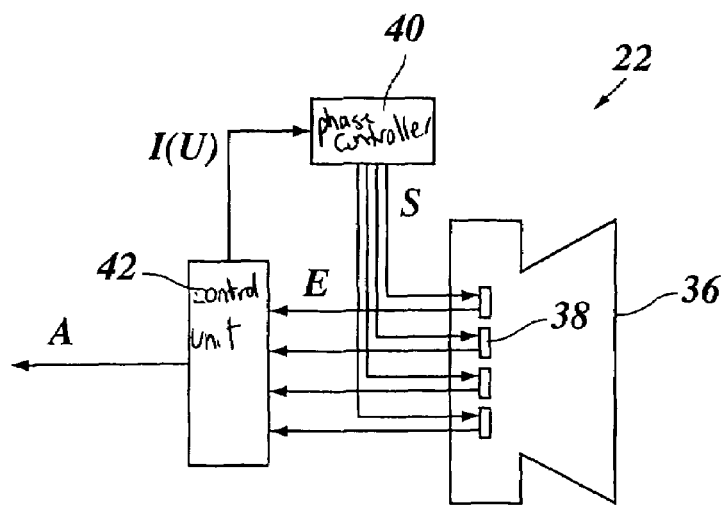
FIG. 2 shows a block diagram of a radar sensor.

The design of the radar sensors, e.g., of radar sensor 22, is schematically shown in FIG. 2. Antenna 36 has at least two separately controllable patches 38; in the example shown there are four. A separate signal S is sent from phase controller 40 to each patch 38, and is emitted as a radar signal over a relatively large angular range via patch 38 and antenna 36. Signals S sent simultaneously to the individual patches 38 differ in their phase positions, so that the individual signals interfere with one another in a specific manner. As a result of destructive and constructive interference, main lobe 26 and secondary lobe 28 characteristics are obtained. In the example shown in FIG. 1, the settings in phase controller 40 for the phase relationship between the individual signals S are fixed. Control unit 42 sends pulse signal I to phase controller 40 and receives a signal E from each of patches 38, which represents the radar echo received. Each pulse of pulse signal I results in the transmission of a short radar pulse, which is reflected off the objects (vehicles 18, 20) and received back again by patches 38 with a time delay characteristic of the object in question (propagation time) and a Doppler frequency shift characteristic of the relative speed of said object and sent to control unit 42. Control unit 42 analyzes the propagation times, frequencies and phases of the radar echo represented by signals E. By comparing the phases of the radar echoes which are received by various patches 38 and which belong to the same object, i.e., have the same propagation times and Doppler shifts, control unit 42 is able to at least approximately determine the direction from which the echo was received. In this way, it is feasible at least to distinguish whether the echo originates from main lobe 26 or from secondary lobe 28. The distance data, relative speed data, and directional data obtained in this way is sent by control unit 42 as output signal A to an analyzer (not shown), e.g., an electronic lane change assistant, which informs the driver whether it is safe to change lanes.

In the case of other exemplary embodiments, which are described below with reference to FIGS. 3 through 5, the design of the radar sensors shown in FIG. 2 is modified so that in addition to pulse signal I control unit 42 sends phase controller 40 a change-over signal U, which changes the phase relationship between signals S. In this way, the number and/or geometry of radar lobes generated by an individual radar sensor are variable in time.

Figure 3:
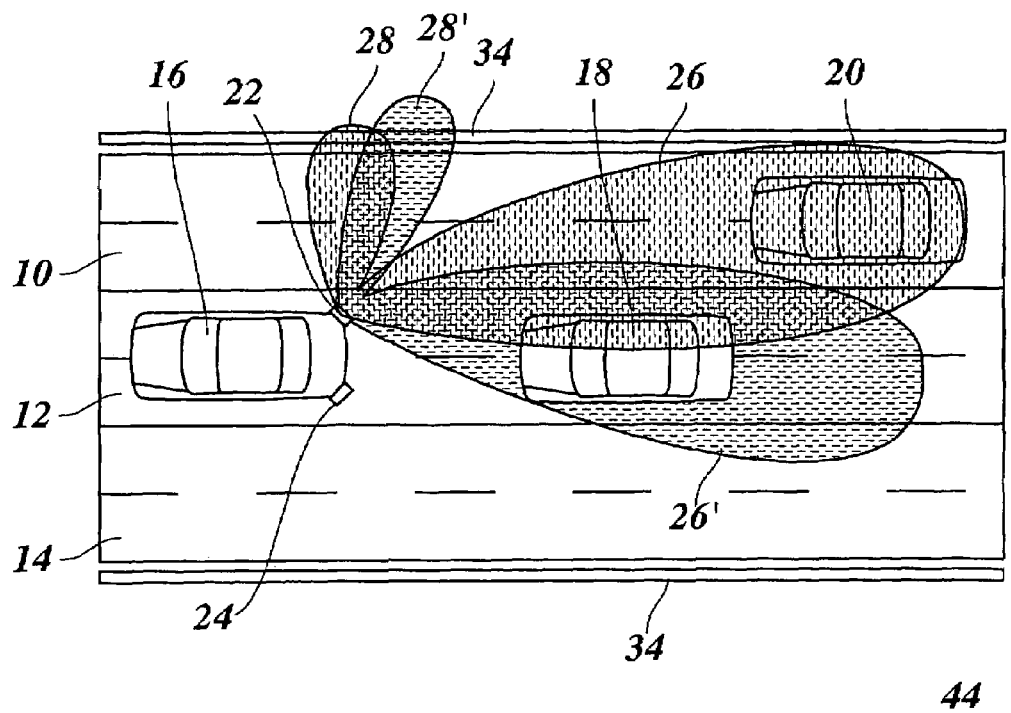
FIGS. 3-5 are schematic drawings showing other exemplary embodiments of the radar system.

FIG. 3 shows the changes to the radar lobes in the case of radar sensor 22. In a first measuring cycle, which may include one or a plurality of radar pulses, radar lobes 26, 28 have roughly the same geometry as in FIG. 1. However, in a subsequent measuring cycle radar lobes 26' and 28' are generated, which, relative to the lobes generated before, have been rotated by a specific angle relative to the middle of the road. Furthermore, main lobe 26 is slightly weakened and thus shortened, while secondary lobe 28' is extended correspondingly. Because of this change in the geometry of the radar lobes, the phases and the amplitudes of the radar echoes received are modified in a characteristic manner. In an extreme case, a radar echo may disappear completely. For example, vehicle 20 in FIG. 3 is covered by a main lobe 26 only in the first cycle, but is not covered by main lobe 26' in the second cycle. This indicates directly that vehicle 20 is in adjacent lane 10 and not in middle lane 12. There would be similar changes in the case of an object detected by secondary lobes 28 and 28'. Constantly varying the geometry of the radar lobes enlarges the effective monitoring area so that any monitoring gaps are closed, and also significantly increases the precision with which directional information is obtained. In addition to using the phase information, it is possible to make use of the fact that the amplitude of the radar echo decreases in a characteristic manner the further the reflecting object moves from the middle of the radar lobe to the edge.

In the simplest case, there is constant alternation between radar lobes 26 and 28 and radar lobe pair 26', 28'. However, it is also optionally possible to vary the angle at which the radar lobes are emitted over a plurality of measuring cycles in a plurality of steps. This change in the direction of the radar lobes may also be used on curves to offset the curve of the road, so that the main lobe generally always remains oriented to the adjacent lane even if the road curves. In this instance, change-over signal U, which results in a change in the direction of emission, varies as a function of the curvature of the road. It is possible to use for example the position of the steering wheel of vehicle 16 as a measure of the curvature of the road.

Figure 4:
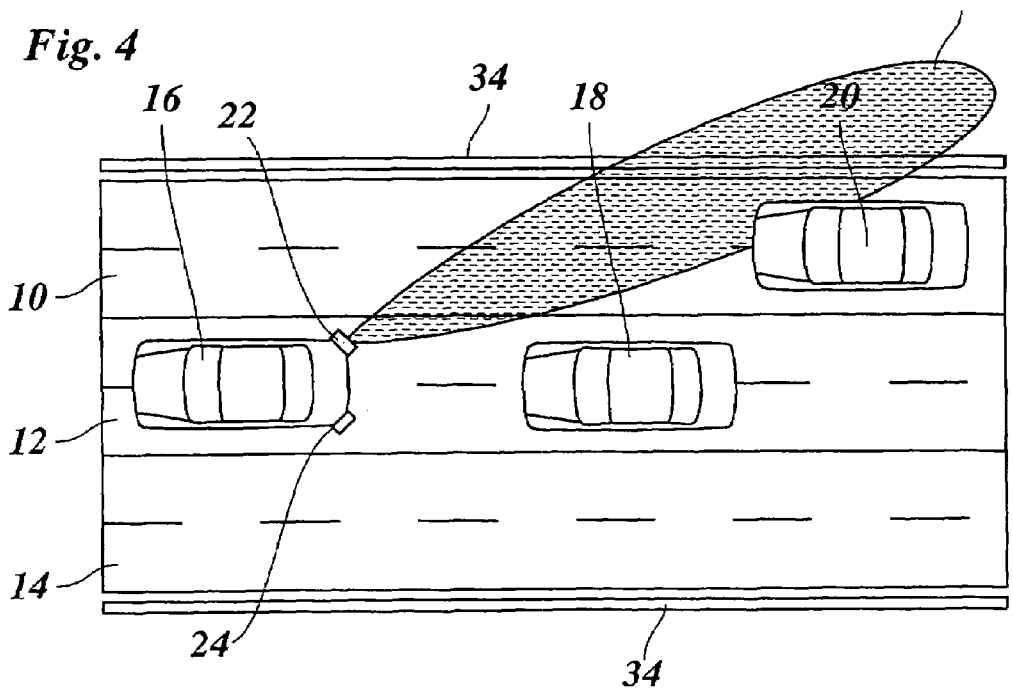

FIG. 4 shows another variant of the radar system. In the first measuring cycle, the radar lobes have the same configuration as in FIG. 3, i.e., there is a main lobe 26 and a secondary lobe 28. However, in the second measuring cycle these lobes are not rotated but rather merged to form a single lobe 44, which has a larger range and a median angular position. The change-over between the configuration having one lobe and that having two also results in characteristic changes in the amplitudes and phase positions, thus allowing localization at a high angular resolution. It is possible to immediately distinguish between vehicle 20 in the adjacent lane and vehicle 18 in the host vehicle's lane 12, because lobe 26 sees both vehicles, while lobe 44 only sees vehicle 20. Guard rail 34 is seen by both lobes and is therefore detected even under unfavorable conditions.

Figure 5:
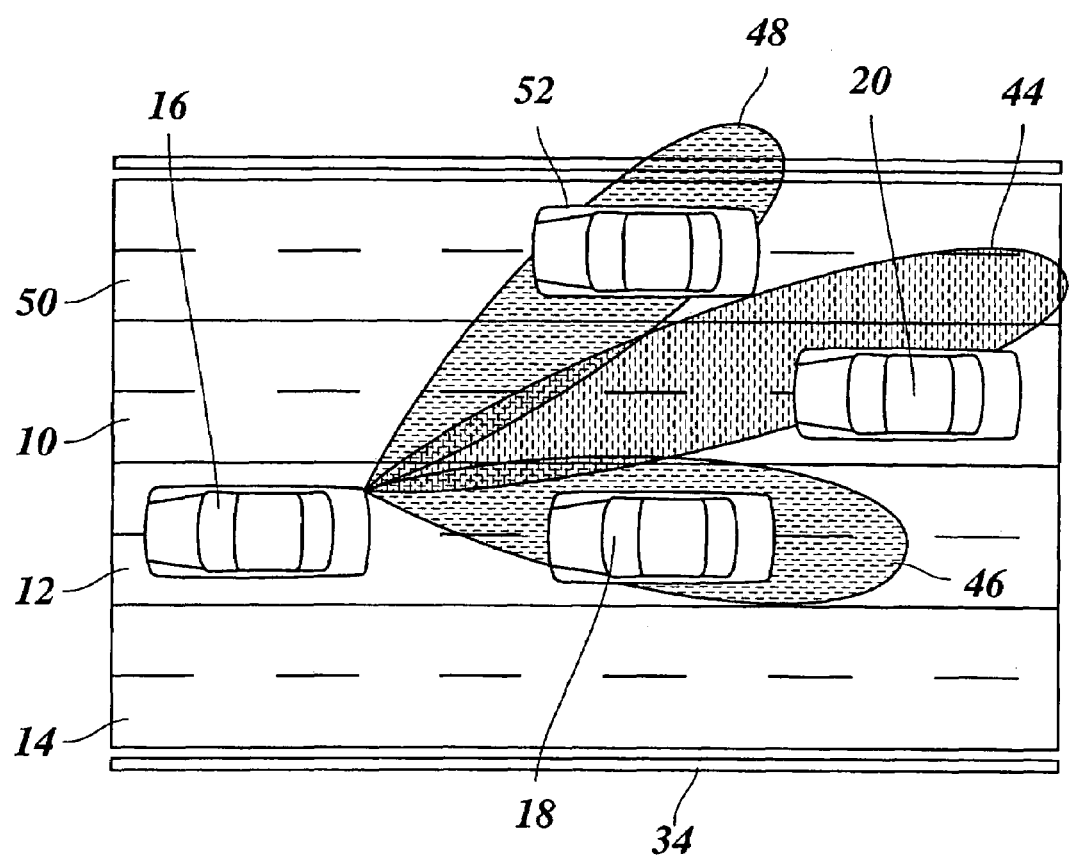

FIG. 5 shows a further type of embodiment in which there is a periodic change-over between individual radar lobe 44 and two lobes 46, 48 which are of roughly the same size and are roughly symmetrical to lobe 44. As this involves a relatively large area in which a vehicle is visible not only to lobe 44 but also to one of lobes 46, 48, directional information may be obtained with relatively high precision by changing over between the configurations and by analyzing amplitude and phase. Lobe 46 also allows direct detection of vehicles in lane 12 in which the host vehicle 16 is traveling.

FIG. 5 also shows by way of example a four-lane road having a further lane 50, which is the lane after next with respect to lane 12 in which vehicle 16 is traveling. Because lobe 48 has a large range, vehicle 52 traveling in lane 50 after next may also be located and assigned to the correct lane.

The types of embodiment shown in FIG. 4 and FIG. 5 of course also allow adjustment of the radar lobes in accordance with the curvature of the road.

What is claimed is:

1. A radar system for a motor vehicle, comprising:
a control device; and
a radar sensor to monitor an area surrounding the motor vehicle without the presence of another radar sensor monitoring the same area, the sensor configured to monitor traffic in a lane adjacent to the motor vehicle, the radar sensor including a phase-controlled antenna and the control device configured to set a plurality of radar lobes having differing geometries, the control device being further configured to generate different configurations of radar lobes in succession over time by changing at least one of a total number of radar lobes being generated at a particular time and a geometry of the plurality of radar lobes, the change occurring during vehicle operation;
wherein the control device analyzes propagation times, frequencies and phases of a radar echo to determine direction from which the echo was received and distinguish which one of the plurality of radar lobes the echo originated from.

2. The radar system as recited in claim 1, wherein the control device is configured to generate at least from time to time at least two radar lobes having differing directions of emission simultaneously.

3. The radar system as recited in claim 2, wherein the radar lobes are of different sizes.

4. The radar system as recited in claim 3, wherein a larger one of the two radar lobes is oriented obliquely toward a rear and side with respect to a longitudinal direction of the motor vehicle, and a smaller one of two radar lobes is oriented to the side with respect to the longitudinal direction of the motor vehicle.

5. The radar system as recited in claim 2, wherein the radar lobes are of approximately a same size, and one of the radar lobes is oriented toward approximately a rear with respect to a longitudinal direction of the motor vehicle and the other one of the radar lobes is oriented obliquely toward the rear and to a side of the motor vehicle.

6. The radar system as recited in claim 1, wherein a configuration of radar lobes generated at a first instant is rotated by a specified angle relative to a configuration of radar lobes generated at another instant.

7. The radar system as recited in claim 1, wherein the configurations of radar lobes generated successively over time differ with regard to the number of separate radar lobes.

8. The radar system as recited in claim 7, wherein the control device is configured to alternately generate a configuration having two radar lobes and a configuration having only one radar lobe, the one radar lobe being located approximately on a bisector of the two radar lobes of the other configuration.

9. The radar system as recited in claim 1, wherein the control device is configured to vary a direction of emission of the radar lobes as a function of curvature of a road.

10. The radar system as recited in claim 6, wherein a geometry of each of the radar lobes is changed when the radar lobes are rotated.

11. The radar system as recited in claim 8, wherein the one radar lobe is formed by merging the two radar lobes.

* * * * *

UNITED STATES PATENT AND TRADEMARK OFFICE
CERTIFICATE OF CORRECTION

PATENT NO. : 7,663,533 B2
APPLICATION NO. : 10/587664
DATED : February 16, 2010
INVENTOR(S) : Toennesen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 11 days.

Signed and Sealed this

Thirtieth Day of November, 2010

David J. Kappos
*Director of the United States Patent and Trademark Office*